Figure 1:
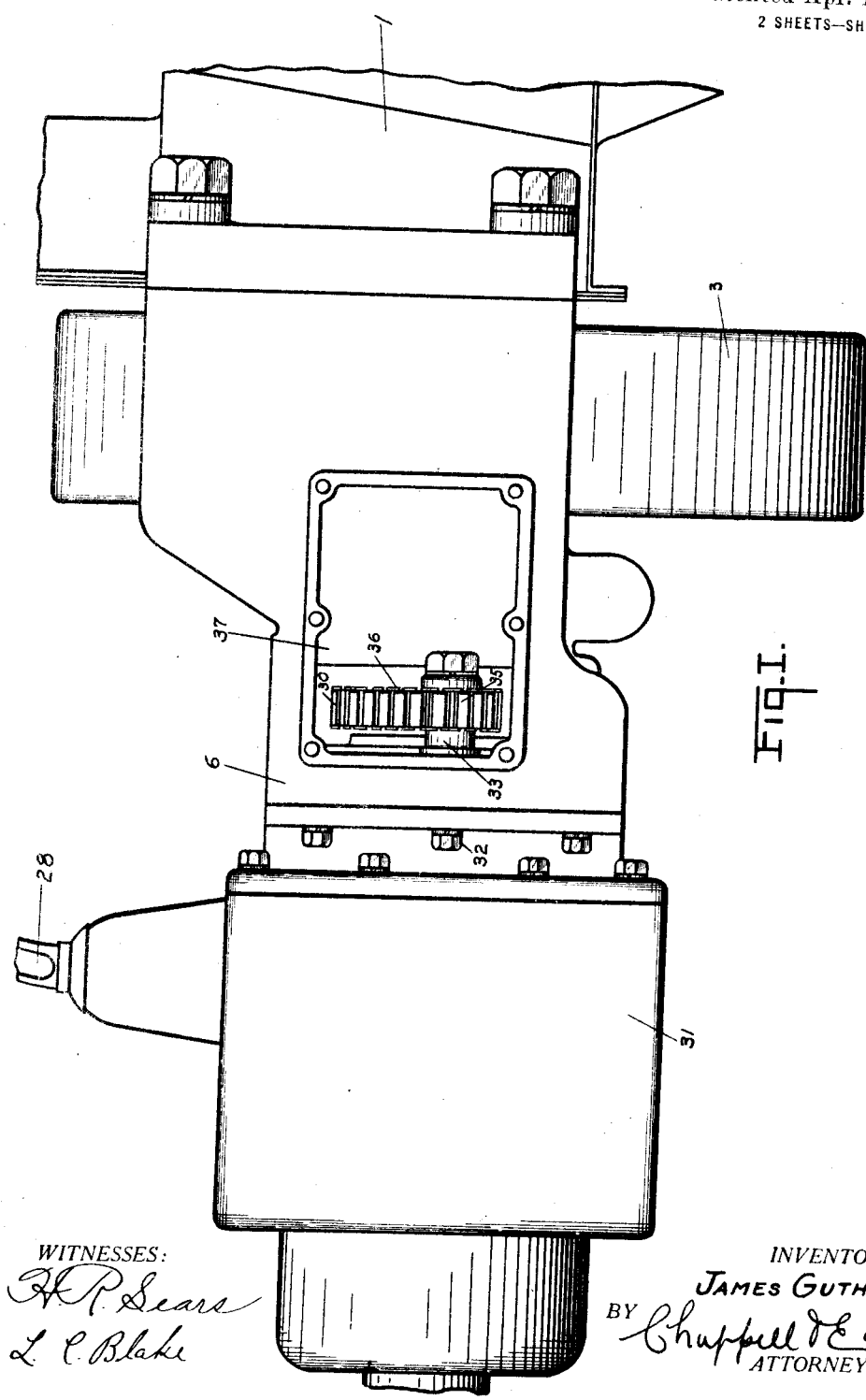

J. GUTHRIE.
TRANSMISSION GEARING.
APPLICATION FILED AUG. 6, 1915.

1,178,917.

Patented Apr. 11, 1916.
2 SHEETS—SHEET 1.

WITNESSES:
H. P. Sears
L. C. Blake

INVENTOR.
JAMES GUTHRIE
BY Chappell & Earl
ATTORNEYS.

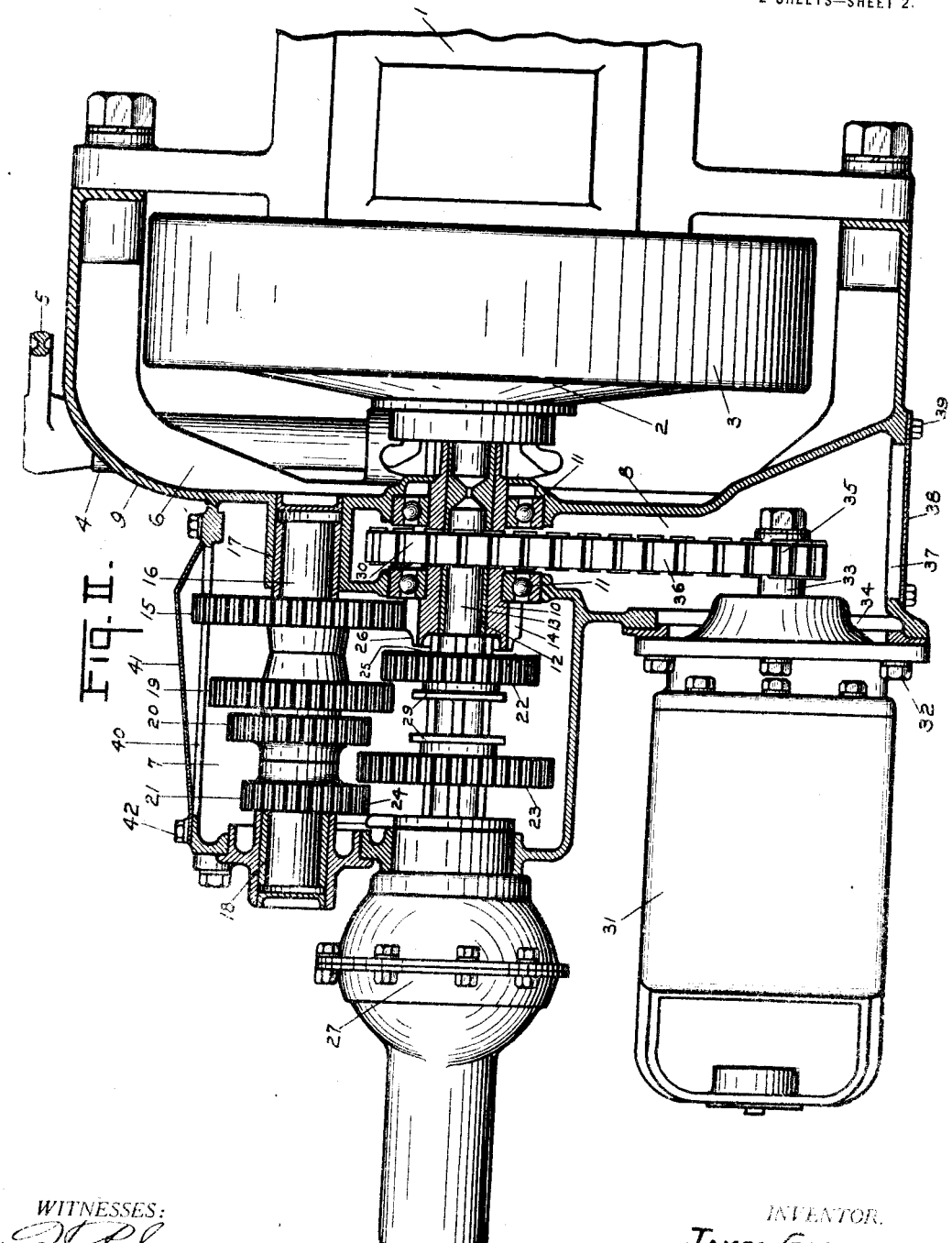

UNITED STATES PATENT OFFICE.

JAMES GUTHRIE, OF JACKSON, MICHIGAN, ASSIGNOR TO BRISCOE MOTOR CO., INC., OF JACKSON, MICHIGAN.

TRANSMISSION-GEARING.

1,178,917. Specification of Letters Patent. Patented Apr. 11, 1916.

Application filed August 6, 1915. Serial No. 44,094.

*To all whom it may concern:*

Be it known that I, JAMES GUTHRIE, a citizen of the United States, residing at Jackson, Michigan, have invented certain new and useful Improvements in Transmission-Gearing, of which the following is a specification.

This invention relates to improvements in transmission gearing.

The main objects of this invention are: First, to provide in a motor vehicle an improved transmission mechanism and starting motor mounting. Second, to provide in a motor vehicle an improved mounting and driving connection for the starting motor of motor vehicles. Third, to provide in a motor vehicle an improved combined gear casing and support which may be readily assembled in the vehicle or disassembled to afford access to the parts contained therein. Fourth, to provide a structure of the class described which is simple and compact in structure and also simple and economical in its parts.

Further objects, and objects relating to details and economies of construction and operation will definitely appear from the detailed description to follow.

I accomplish the objects of my invention by the devices and means described in the following specification.

The invention is clearly defined and pointed out in the claims.

A structure constituting a preferred embodiment of my invention is illustrated in the accompanying drawing forming a part of this specification, in which:

Figure I is a detail side elevation of a structure embodying features of my invention, the closure plate at the end of the starting motor driving connection chamber being removed. Fig. II is a detail plan view with parts in horizontal section.

In the drawings similar reference numerals refer to similar parts in both views.

Referring to the drawing, 1 represents an explosion engine shown in conventional form. The mounting of the motor in the chassis is not illustrated as it forms no part of my present invention. The control clutch 2 is in the structure illustrated arranged within the fly wheel 3. This clutch is controlled by the rock shaft 4 and the lever 5. As the details of the clutch and lever connections form no part of this invention they are not further illustrated herein.

At the side of the fly wheel, I mount a support member 6 provided with a gear box 7 and a chamber 8 for the driving connections for the starting motor and generator 31. This gear support member is provided with yoke-like bracket arms 9 secured to the engine 1 so that the support is rigidly connected thereto. These bracket arms 9 embrace the fly wheel.

The driving member 10 is connected to the crank shaft of the engine 1 by the control clutch 2. The driving member 10 is arranged in suitable bearings of the ball type, designated generally by the numeral 11 disposed in the walls of the chamber 8. The driving member 10 has an internal bearing 12 for the driven shaft 13 of the transmission mechanism. On the driving member 10 is a driving gear 14 meshing with the gear 15 on the driving transmission shaft 16. The driving transmission shaft is arranged with its front end in a bearing 17 formed in the support 6 and its rear end in a bearing 18 mounted in the outer end of the gear box.

The driving transmission shaft 16 is provided with gears 19, 20 and 21 while the driven transmission shaft 13 is provided with gears 22 and 23 which are splined thereto to be shifted into engagement with the gears 19 and 20 respectively, the gear 23 being also adapted to be shifted into mesh with the reversing gear 24 driven by the gear 21. The gear 22 also carries a clutch member 25 coacting with the clutch member 26 on the driving member 10. The driven transmission shaft 13 is connected to the propeller shaft of the vehicle by a universal joint, designated generally by the numeral 27. The clutch and the selective gears are controlled by the lever 28. The connections for the lever to the collars 29 on the gears are not shown as they are well understood in the art.

Disposed on the driving member between its bearings is a gear 30 of the sprocket type The starting motor and generator, which is designated generally by the numeral 31, is secured to the support member 6 by the bolts 32 so that its driving shaft 33 projects into the chamber 8, the rear wall of the chamber being provided with an opening 34. On the shaft 33 is a sprocket gear 35 connected by the belt or chain 36 to the gear 30 on the driving member. With the parts thus arranged, the motor is suitably supported and its driving connections suitably housed. An opening 37 is provided at the end of the chamber 8 to afford access to the parts within and for the introduction of lubricant. This opening is closed by the closure plate 38 secured by the bolts 39. The gear box 7 is provided with a side opening 40. This opening 40 is provided with closure plate 41 secured by the bolts 42. With the parts thus arranged, the transmission mechanism and starting motor are effectively supported and retained in alinement with the crank shaft of the engine. While the parts are very compactly arranged, they are all readily accessible.

I have illustrated and described my improvements in detail in a simple and practical embodiment. I have not attempted to illustrate or describe various modifications which I contemplate as I believe the disclosure made will enable those skilled in the art to which my invention relates to embody or adapt the same as conditions may require. I desire, however, to be understood as claiming my improvements specifically in the form illustrated as well as broadly within the scope of the appended claims.

Having thus described my invention, what I claim as new and desire to secure by Letters Patent is:—

1. In a structure of the class described, the combination with an engine comprising a crank shaft and a fly-wheel therefor, of a support member provided with a transmission gear box and a motor driving gear chamber disposed at the front of and extending to one side of the gear box, said support member being provided with bracket arms embracing said fly-wheel and secured to the engine, a driving member disposed through said chamber and provided with an internal bearing at its rear end, bearings for said driving member disposed in the walls of said chamber, a clutch connecting said driving member to the crank shaft of the engine, a gear arranged on said driving member between its said bearings, a transmission gearing arranged within said gear box and comprising a gear on the rear end of said driving member, a driving transmission shaft provided with a gear meshing with said gear on said driving member, a driven transmission shaft disposed with its front end in said bearing in said driving member and provided with a clutch connection thereto, said transmission shafts being provided with coacting selective gears, a motor mounted on said support member at the side of said gear box and provided with a driving shaft projecting into said chamber, a gear on said motor shaft, and a belt connecting said starting gear on said driving member to said gear on said motor shaft.

2. In a structure of the class described, the combination with an engine comprising a crank shaft and a fly-wheel therefor, of a support member provided with a transmission gear box and a motor driving gear chamber disposed at the front of and extending to one side of the gear box, said support member being provided with bracket arms embracing said fly-wheel and secured to the engine, a driving member disposed through said chamber, bearings for said driving member disposed in the walls of said chamber, a clutch connecting said driving member to the crank shaft of the engine, a gear arranged on said driving member between its said bearings, a transmission gearing arranged within said gear box and operatively associated with said driving member, a motor mounted on said support member at the side of said gear box and provided with a driving shaft projecting into said chamber, a gear on said motor shaft, and a belt connecting said starting gear on said driving member to said gear on said motor shaft.

3. In a structure of the class described, the combination with an engine comprising a crank shaft and a fly-wheel therefor, of a support member provided with a transmission gear box and a motor driving gear chamber disposed at the front of and extending to one side of the gear box, said support member being provided with bracket arms embracing said fly-wheel and secured to the engine, a driving member disposed through said chamber and provided with an internal bearing at its rear end, bearings for said driving member disposed in the walls of said chamber, a clutch connecting said driving member to the crank shaft of the engine, a gear arranged on said driving member between its said bearings, a transmission gearing arranged within said gear box and comprising a gear on the rear end of said driving member, a driving transmission shaft provided with a gear meshing with said gear on said driving member, a driven transmission shaft disposed with its front end in said bearing in said driving member and provided with a clutch connection thereto, said transmission shafts being provided with coacting selective gears, a motor mounted on said support member at the side of said gear box, and driving connections from said motor to said starting gear on said driving shaft.

4. In a structure of the class described, the combination with an engine comprising a crank shaft and a fly-wheel therefor, of a support member provided with a transmission gear box and a motor driving gear chamber disposed at the front of and extending to one side of the gear box, said support member being provided with bracket arms embracing said fly-wheel and secured to the engine, a driving member disposed through said chamber, bearings for said driving member disposed in the walls of said chamber, a clutch connecting said driving member to the crank shaft of the engine, a gear arranged on said driving member between its said bearings, a transmission gearing arranged within said gear box and operatively associated with said driving member, a motor mounted on said support member at the side of said gear box, and driving connections from said motor to said starting gear on said driving shaft.

5. In a structure of the class described, the combination of a support member provided with a transmission gear box and a motor driving gear chamber disposed at the front of and extending to one side of the gear box, a driving member disposed through said chamber and provided with an internal bearing at its rear end, bearings for said driving member disposed in the walls of said chamber, a gear on said driving member between its said bearings, a transmission gearing arranged within said gear box and comprising a gear on the rear end of said driving member, a driving transmission shaft provided with a gear meshing with said gear on said driving member, a driven transmission shaft disposed with its front end in said bearing in said driving member and provided with a clutch connection thereto, said transmission shafts being provided with coacting selective gears, a motor mounted on said support member at the side of said gear box and provided with a driving shaft projecting into said chamber, a gear on said starting motor shaft, and driving connections from said starting gear on said driving member to said gear on said motor shaft.

6. In a structure of the class described, the combination of a support member provided with a transmission gear box and a motor driving gear chamber disposed at the front of and extending to one side of the gear box, a driving member disposed through said chamber, bearings for said driving member disposed in the walls of said chamber, a gear on said driving member between its said bearings, a transmission gearing arranged within said gear box and operatively associated with said driving member, a motor mounted on said support member at the side of said gear box and provided with a driving shaft projecting into said chamber, a gear on said starting motor shaft, and driving connections from said starting gear on said driving member to said gear on said motor shaft.

7. In a structure of the class described, the combination with an engine, of a support member provided with a transmission gear box and a motor gear chamber mounted on said engine, a driving member disposed through said chamber, a gear on said driving member, a transmission gearing arranged within said gear box and operatively associated with said driving member, a motor mounted on said support member provided with a driving shaft projecting into said chamber, a gear on said motor shaft, and connections from said gear on said driving member to said gear on said motor shaft.

8. In a structure of the class described, the combination of a support member provided with a transmission gear box and a motor gear chamber, a driving member disposed through said chamber, a gear on said driving member, a transmission gearing arranged within said gear box and operatively associated with said driving member, a motor mounted on said support member provided with a driving shaft projecting into said chamber, a gear on said motor shaft, and connections from said gear on said driving member to said gear on said motor shaft.

9. In a structure of the class described, the combination with an engine, of a support member provided with a transmission gear box and a motor driving gear chamber mounted on said engine, a driving member, a transmission gearing arranged within said gear box and operatively associated with said driving member, a motor mounted on said support member, and driving connections therefor to said driving member disposed in said chamber.

10. In a structure of the class described, the combination of a support member provided with a transmission gear box and a motor driving gear chamber, a driving member, a transmission gearing arranged within said gear box and operatively associated with said driving member, a motor mounted on said support member, and driving connections therefor to said driving member disposed in said chamber.

11. In a structure of the class described, the combination with an engine, of a support member mounted on said engine and provided with a transmission gear box, a driving member, a transmission gearing arranged within said gear box and operatively associated with said driving member, a motor mounted on and carried by said support member, and driving connections therefor to said driving member.

12. In a structure of the class described, the combination with an engine, of a support member mounted on said engine and provided with a transmission gear box and a motor driving gear chamber, a transmission gearing arranged within said gear box, a motor mounted on said support member, and driving connections therefor to said driving engine disposed in said chamber.

In witness whereof, I have hereunto set my hand and seal in the presence of two witnesses.

JAMES GUTHRIE. [L. S.]

Witnesses:
FRED MACHLIN,
A. T. SEARLES.